United States Patent [19]

Ballard et al.

[11] 4,024,209
[45] May 17, 1977

[54] METHOD FOR MAKING NUCLEAR FUEL RODS

[75] Inventors: Albert S. Ballard, San Diego; Roy G. Cooper, Rancho Santa Fe; Dwight E. Davis, Escondido, all of Calif.

[73] Assignee: General Atomic Company, San Diego, Calif.

[22] Filed: June 10, 1975

[21] Appl. No.: 585,689

Related U.S. Application Data

[63] Continuation-in-part of Ser. No. 404,988, Oct. 10, 1973, abandoned.

[52] U.S. Cl. .................................... 264/.5; 423/78; 252/301.1 R
[51] Int. Cl.² ...................................... G21C 21/00
[58] Field of Search ....................... 264/.5; 423/78; 252/301.1 R

[56] References Cited

UNITED STATES PATENTS

| | | | |
|---|---|---|---|
| 2,997,744 | 8/1961 | Stoddard et al. | 264/.5 |
| 3,132,379 | 5/1964 | Crane | 425/78 |
| 3,236,921 | 2/1966 | Sermon | 264/.5 |
| 3,558,750 | 1/1971 | Davis et al. | 264/.5 |
| 3,567,437 | 3/1971 | Mott | 264/.5 |
| 3,714,305 | 1/1973 | Davis et al. | 264/.5 |
| 3,720,739 | 3/1973 | Hagie et al. | 264/.5 |
| 3,933,679 | 1/1976 | Weitzel et al. | 264/.5 X |

*Primary Examiner*—Peter A. Nelson
*Attorney, Agent, or Firm*—Fitch, Even, Tabin & Luedeka

[57] ABSTRACT

A mold cavity is only partially filled with nuclear fuel particles and is closed. The volume of the cavity is then reduced until the fuel particles substantially fill the mold cavity. The mold may be heated and a fluid solidifiable binder injected into the mold cavity to fill the interstices between the fuel particles while the cavity volume is further decreased during injection of the binder to avoid formation of voids. Flow of excess binder through an upper vent passage assures complete filling of the cavity.

7 Claims, 7 Drawing Figures

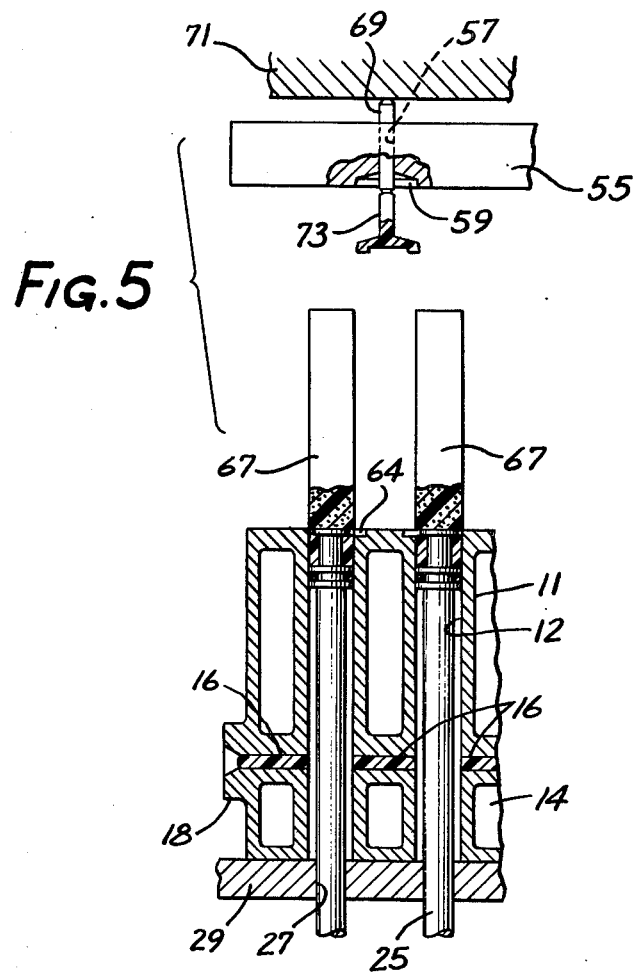

METHOD FOR MAKING NUCLEAR FUEL RODS

This application is a continuation-in-part of our earlier application Ser. No. 404,988, filed Oct. 10, 1973, now abandoned.

This invention relates to the manufacture of nuclear fuel rods and, more particularly, to an improved method for making nuclear fuel rods wherein nuclear fuel particles are embedded within solid binder material.

Nuclear reactors are sometimes constructed in a configuration wherein the fissionable material or nuclear fuel is formed into or contained in rods held within the reactor core in a desired relationship. One particular rod design which has been found useful is that wherein the nuclear fuel is in particulate form and is held suspended within a solidified binder material molded into the rod form.

A convenient way of manufacturing nuclear fuel rods of the foregoing type is to provide a mold into which fuel particles are loaded and into which a plasticized binder fluid material is injected and then solidified in situ. Unfortunately, there have been problems associated with this particular procedure.

One problem is that efficiency, materials-use considerations an proper reactor design make it desirable that the fuel particles be densely distributed throughout such fuel rods. To this end, mold cavities are typically filled to the top with nuclear particles prior to injection of the binder. Vibration and shock, however, can cause overspill of the particles from the molds, creating unevenness in fuel loading and a situation in which expensive techniques must be employed to retrieve overspilled nuclear fuel particles.

Another problem associated with fuel rods of the type under consideration is that partial settling of the fuel bed may occur as a result of the pressure during injection. This can leave a region within a fuel rod deficient of fuel particles.

A final problem is a result of underfilled molds which can result in voids or in creating undesirable end caps of substantially only binder.

It is an object of the present invention to provide an improved method for making nuclear fuel rods comprising nuclear fuel particles held together by a binder material.

It is another object of the invention to provide a method for manufacturing a nuclear fuel rod in which problems of overspill, particle breakage, and voids are avoided.

Other objects of the invention will become apparent to those skilled in the art from the following description when read in connection with the accompanying drawings wherein:

FIGS. 3, 4 and 5 are full section views of the apparatus illustrating further steps of the fuel rod production method;

Very generally, the invention pertains to the manufacture of a nuclear fuel rod in which a mold cavity is partially filled with a bed of nuclear fuel particles and is then closed. The cavity volume is made reducible and is reduced such that fuel particles substantially fill the mold cavity. A fluid solidifiable binder is then injected into the mold cavity to fill the interstices between the fuel particles. The continuing adjustability of the volume of the mold cavity enables compensation for bed contraction resulting from binder injection under pressure and also avoids formation of the voids and/or end caps when the binder material cools and solidifies. Finally, a piston or adjustable column mechanism which is provided to effect adjustment of mold cavity volume is also used to eject the fuel rod from the cavity after solidification.

Figure 1:
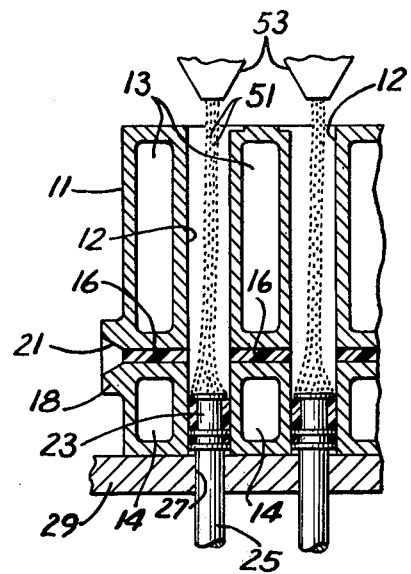
FIG. 1 is a full section view of apparatus illustrating the performance of an initial step in a fuel rod production method embodying various features of the invention.

Referring now more particularly to FIG. 1, a cast housing 11 is shown which contains several mold cavities 12 in the form of cylindrical cavities of circular cross section. The cavities may be machined to provide an interior smooth surface, and the housing is also provided with passages 13 and 14 through which a suitable heating fluid or coolant is circulated in order to heat or cool the mold as required during the molding process. The cavities 12 are each of identical construction.

A horizontal bore 16 is provided in the housing 11 in a location where it intersects all of the cavities 12 near the lower ends thereof. The bore 16 terminates on the exterior of the housing 11 at a raised boss 18 in which a socket 21 is provided for purposes explained below.

The lower ends of each of the cavities 12 are closed by a piston 23 attached to the upper end of a piston rod 25 which passes through a suitable opening 27 formed in a lower closure plate 29. The closure plate 29 is suitably secured to the underside of the housing 11 by means not shown. The employment of the movable piston 23 enables the interior volume of the mold cavity 12 to be adjusted as desired.

Figure 6:
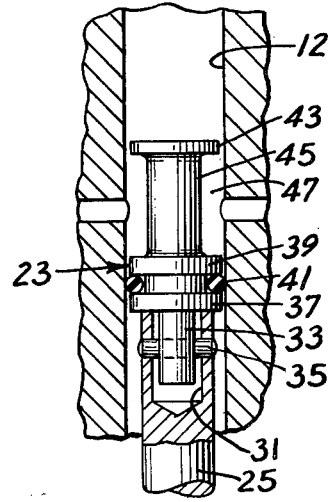
FIG. 6 is an enlarged full section view illustrating a portion of the apparatus of FIGS. 1 through 5 in greater detail.

Referring to FIG. 6, the detailed construction of the piston 23 may be clearly seen, along with the upper end of the piston rod 25 which has an axial bore 31. The lower end of the piston has a cylindrical projection 33 which extends downwardly into the axial bore 31 and is held therein by a transverse pin 35 that is received in aligned openings in the upper end of the piston rod 25 and in the cylindrical extension 33. A land 37 is provided on the piston 23 which provides a close, sliding fit with the inner wall of the mold cavity 12. A second land 39 is spaced above the land 37 and also provides a close sliding fit with the cavity wall. The lands 37, 39 assure the piston slides smoothly up and down within the cylindrical mold cavity. An O-ring 41 is held between the lands 37 and 39 to provide a positive fluid seal between the piston and walls of the cavity 12.

The piston 23 is formed with an uppermost head 43 which is dimensioned so there is some clearance between its periphery and the inner surface of the cavity 12. In the region between the head 43 and the land 39, the piston 23 is necked down to a stem portion 45 to provide an annular space 47 between the piston and the walls of the cavity 12.

Prior to molding fuel rods, the mold 11 is primed. An injection device 61 having a nozzle 63 is brought in mating engagement with the recess 21 in the boss 18 of the mold housing. At the same time, a suitable heated liquid is circulated through the passageways 13 and 14 in the mold to bring it up to the desired temperature. When the appropriate temperature is reached, a suitable fluid binder is injected into the horizontal bore 16 with the pistons located at the vertical levels shown in FIGS. 3 and 4.

The illustrated fuel rods are designed for use in a graphite-moderated reactor, and a binder is used which can be subsequently carbonized to produce a substantially carbon matrix wherein the nuclear fuel particles will be individually supported. The binder is usually a pitch material, such as coal tar pitch, and may contain additional fillers, such as graphite flour or the like, as is known in this art. In general, the binder may be any type of plastic material which can be rendered fluid by the application of heat and which can be solidified by cooling to about room temperature. Because the molding process contemplates heating, cooling and reheating of the binder, it should have thermoplastic properties, as opposed to being based upon a resin which will cross-link or otherwise rigidify upon initial application of heat and thereafter resist softening.

The binder injected into the main bore 16 flows about each of the stems 45 of the pistons through each annular space 47 and into the next continuation section of the horizontal bore 16. The binder also flows upward through the clearance provided about the head 43 of each piston to fill the mold cavity 12. After the cavities are all filled with binder, which will mean that the annular spaces 47 about the piston stems 45 are likewise filled, injection of binder is halted, as is heating of the mold 11. Coolant is then circulated through passageways 13 and 14 to cause solidification of the binder in the mold cavities. Thereafter, the top of the mold cavities is removed, and the piston rods 25 are driven upward, as by the application of hydraulic pressure, to eject the cylindrical slugs of solidified binder from the mold cavities 12. Because of its thermoplastic character, the binder material can be salvaged and reused if desired. After ejection, the pistons 23 are retracted to their lowermost position depicted in FIG. 1, and molding of fuel rods is ready to begin.

Figure 2:
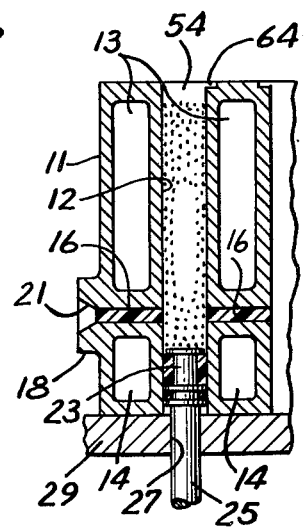
FIG. 2 is a full section view illustrating the apparatus of FIG. 1 showing a subsequent step of the method.

With the mold suitably primed and the pistons 23 lowered, nuclear fuel particles 51 are metered into the cavities from a suitable hopper 53 to only partially fill each cavity. As can be seen in FIG. 2, after filling with the metered charge of fuel particles, a temporary excess space 54 is left at the top of each mold cavity. Because the mold was primed with binder, the binder occupies the clearance between the piston head 43 and the inner wall of the cavity 12, as well as all of the sections of the horizontal bore 16 and thus confines the fuel particles to the cylindrical cavities.

Figure 3:
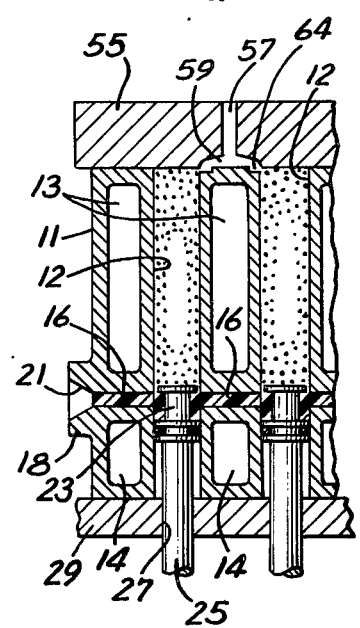

After the mold cavities have each received their metered charges of fuel particles, a mold cover plate 55 is attached to the top of the housing 11 and suitably secured thereto by means not shown. The pistons 23 are then raised to an intermediate position by moving the piston rods 25 upward, by the application of hydraulic pressure or the like, in order to substantially eliminate the temporary excess space 54 within each mold cavity so that the particles 51 substantially completely fill the space in the mold cavity between the piston 23 and the mold cover plate 55. Preferably, the piston is moved upwardly with sufficient force to slightly compact the bed of fuel particles therewithin, as depicted in FIG. 3. However, the fuel particles preferably have individual fission-product-retentive coatings, as for example pyrolytic carbon coatings, and care is taken not to fracture the coatings. Generally, coated fuel particles between about 500 and 1200 microns in size are used. Usually, the piston 23 will not be driven to exert a pressure of more than about 600 p.s.i. upon the particles at this time. The cover plate 55 is provided with a plurality of apertures 57 therein which are not aligned with the mold cavities but which communicate with large circular recesses 59 on the underside of the mold cover plate, that are positioned in the areas between the mold cavities, the purposes of which are explained below.

Figure 4:
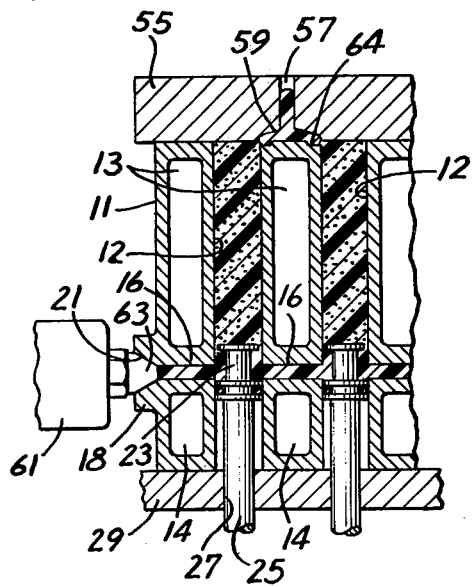

Referring now to FIG. 4, the mold cavities 12 are ready for the injection of the solidifiable binder, and the mold is heated by circulating a hot liquid therethrough to soften the binder with which the mold was earlier primed. With the mold at the desired temperature, binder is supplied from an injection device 61 through the nozzle 63 and flows through the bore, through the annular space 47 around each of the piston stems 45, upward past the piston head 43 and into the mold cavity 12. The annular space around each piston registers with the next section of the bore 16 and thus serves as a feeder connection to the next adjacent mold cavity 12. The clearance between the head 43 on each piston 23 and the wall surface of the cavity 12 is dimensioned to prevent the passage of fuel particles therepast, and it acts as a gate through which the fluid binder material enters the mold cavity where the particle bed is located.

As the binder enters the particle bed, its lubricity allows the coated fuel particles to readjust their positions and settle still further. This settling is accompanied by upward incremental movements of the piston which, due to the continued upward hydraulic biasing, applies a constant pressure, preferably at least about 600 p.s.i. on the particle bed, keeping it compacted. The piston is also free to move to accommodate any minor shifts in the particle bed due to differential thermal expansion. Because the gate which is formed between the piston head 43 and the inner surface of the mold cavity also travels with any movement in the bed, the effect is one of a moving gate in the molding process, which is possible even though the horizontal bore 16 is stationary, because the axial length of the annular recess 47 is sufficient to remain in registration with the sections of the bore 16.

At the beginning of the injection of the fluid binder material, air is expelled from the cavity via an air vent 64 in the form of a shallow groove provided at the top edge of the mold cavity. The circular recess 59 in the underside of the cover plate 55 overlaps the air vent 64, and the aperture 57 leads upward from this recess and out through the plate. Typically, one recess 59 and one aperture 57 serve each pair of cavities, and the groove is dimensioned, e.g., about one-eighth inch long by 0.005 inch deep to prevent the entry of fuel particles thereinto. Air is expelled from the cavity during injection of the fluid binder via the air vent 64, the recess 59 and the aperture 57 to the atmosphere. Once the cavity 12 is completely filled, excess binder material can flow into the recess 59 through the vent passage 64 and up into the aperture 57, as shown in FIG. 4. However, the vent passage 64 is sized so that the coated fuel particles cannot pass therethrough so that there can be no loss of fuel from the metered charge. Once the fluid material reaches the vent passage 64, the back pressure in the mold cavity rises, which in turn restricts the flow of fluid material into that particular cavity, routing it instead through the bore 16. Thus, the vents 64 are used as a control device to ensure the complete filling of all cavities.

Upon completion of the injection process, cooling and consequent solidification of the binder material is effected. The cover plate 55 is then raised, and the piston rods 25 are driven further upward in the cavities to eject the fuel rods, indicated at 67 in FIG. 5. At the same time, the excess binder material which has escaped into the recess 59 and the bore 57 is ejected by bringing the plate 55 up sufficiently to cause an ejector pin 69 to contact the machine frame, indicated at 71. The solidified excess binder material, indicated at 73, then falls for suitable collection and possible reuse, as the binder will preferably become sufficiently fluid for molding purposes when heated to a temperature of about 150° to 190° C. At relatively low shear rates, i.e., about 20 to 40 sec.$^{-1}$, binders having a viscosity between about 300 and 1000 poise, at 175° C., may be used with coated fuel particles having a minimum size of about 300 microns. However, if higher shear rates are to be employed in the injection, binders having lower viscosities, e.g., 40 to 90 poise may be selected.

Figure 7:
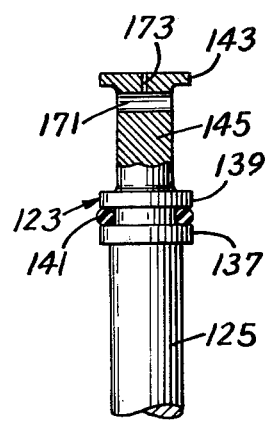
FIG. 7 is an enlarged view similar to FIG. 6 illustrating an alternative configuration.

Referring to FIG. 7, an alternative piston-piston rod combination construction is shown wherein a piston 123 is provided with a pair of lower lands 137 and 139 axially spaced and affixed to the upper end of a piston rod 125. An O-ring 141 is disposed between the lands 137, 139 and a head 143 is provided atop the piston. The head 143 is dimensioned about the same as the lands 137, 139 and forms a close sliding fit with the interior wall of the cavity, not shown. As was the case in the previous embodiment, the piston 123 has a recessed stem 145 that creates an annular space which, when so aligned, interconnects the sections of the bore 16 in the mold cavity. A transverse bore 171 across the piston 123 in the stem 145 provides a passage communicating with the annular space that will be filled with binder, and an axial bore 173 extends to the top of the piston from the passage 171 and acts as the gate which allows fluid binder to enter the mold cavity. Thus, the fluid binder is gated axially through the piston head 143 rather than around the piston head.

The invention thus provides an improved method for manufacturing nuclear fuel rods of the type which employs a plurality of nuclear fuel particles embedded within a solid binder matrix. Accidental spillage of nuclear fuel particles from the mold cavities during and after filling due to vibration and shock is alleviated, due to the fact that the mold cavities are only partially filled. The ability of the mold cavity volume to be adjusted as desired avoids the creation of particle voids caused by the need to apply a negative filling tolerance and caused by bed shrinkage under certain circumstances. These are accomplished by providing a mold of variable geometry such that temporary excess space is initially provided for the easy containment of a metered, full charge of particles but which is capable of subsequent adjustment of the cavity volume during injection of binder material. Moreover, voids which could occur as a result of additional compaction during injection of binder are eliminated by maintaining pressure loading on the bed of particles.

Various modifications of the invention in addition to those shown and described herein will become apparent to those skilled in the art from the foregoing description and accompanying drawings. Such modifications are intended to fall within the scope of the appended claims.

What is claimed is:

1. A method of manufacturing a nuclear rod comprising only partially filling a mold cavity with nuclear fuel particles, closing the mold cavity and reducing the volume thereof such that the fuel particles substantially fill the mold cavity, injecting a fluid solidifiable binder into the particle-filled mold cavity to fill the interstices between the fuel particles while further reducing the volume of said particle-filled mold cavity by applying pressure to the contents thereof via a movable portion of said mold cavity, and solidifying said binder in said cavity to form a fuel rod.

2. A method according to claim 1 wherein the mold is heated prior to said injection.

3. A method according to claim 2 wherein said heating is discontinued and the mold is cooled to solidify said binder.

4. A method according to claim 1 wherein said further reduction of the volume of the mold cavity is effected by raising a movable piston and wherein the fuel rod is subsequently ejected from said cavity after the binder solidifies by opening said cavity and further raising the piston.

5. A method according to claim 1 wherein said fluid binder is caused to flow out a vent passage at the opposite end of said mold cavity from that at which it is injected to assure that complete filling of said cavity occurs, said vent passage being sized to prevent the passage of said nuclear fuel particles therethrough but to allow the passage of said fluid binder.

6. A method according to claim 5 wherein solidified excess binder entering said vent passage is automatically removed therefrom when said mold cavity is opened to eject said solidified nuclear fuel rod.

7. A method according to claim 1 wherein a measured charge of nuclear fuel particles is added to said mold cavity and wherein said particles have fission-product-retentive outer coatings and a particle size of at least about 300 microns.

* * * * *